(12) United States Patent
Liao

(10) Patent No.: US 7,898,754 B2
(45) Date of Patent: Mar. 1, 2011

(54) RESILIENT PLATE AND LENS ACTUATOR USING SAME

(75) Inventor: Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 90 days.

(21) Appl. No.: 12/327,658

(22) Filed: Dec. 3, 2008

(65) Prior Publication Data

US 2010/0020422 A1  Jan. 28, 2010

(30) Foreign Application Priority Data

Jul. 28, 2008  (CN) .......................... 2008 1 0303135

(51) Int. Cl.
G02B 7/02 (2006.01)

(52) U.S. Cl. ...................................... 359/827; 359/819
(58) Field of Classification Search .......... 359/819–828
See application file for complete search history.

(56) References Cited

U.S. PATENT DOCUMENTS

| 7,057,833 | B2 * | 6/2006 | Ooi et al. ..................... 359/819 |
| 7,612,954 | B2 * | 11/2009 | Lin ............................. 359/819 |
| 2008/0186601 | A1 * | 8/2008 | Honma ........................ 359/824 |

* cited by examiner

*Primary Examiner*—Darryl J Collins
(74) *Attorney, Agent, or Firm*—Clifford O. Chi

(57) ABSTRACT

A resilient plate includes a body, a through hole defined in the center of the body, a plurality of slots defined in the body. A plurality of glue-holes is defined in the periphery portion of the body, and the glue-holes are configured for receiving an amount of an adhesive.

13 Claims, 3 Drawing Sheets

RESILIENT PLATE AND LENS ACTUATOR USING SAME

CROSS REFERENCE TO RELATED APPLICATION

This application is related to commonly-assigned application Ser. No. 12/192,376, entitled "RESILIENT PLATE AND LENS ACTUATOR WITH SAME", and Ser. No. 12/342,240, now U.S. Pat. No. 7,848,034, entitled "FLAT SPRING PLATE AND LENS ACTUATOR WITH SAME". Disclosures of the above-identified applications are incorporated herein by reference in its entirety.

BACKGROUND

1. Technical Field

The present invention relates to lens actuators, and particularly, to a resilient plate used in a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

SUMMARY

A resilient plate includes a body, a through hole defined in the center of the body, a plurality of slots defined in the body. A plurality of glue-holes is defined in the periphery portion of the body, and the glue-holes are configured for receiving an amount of adhesive.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
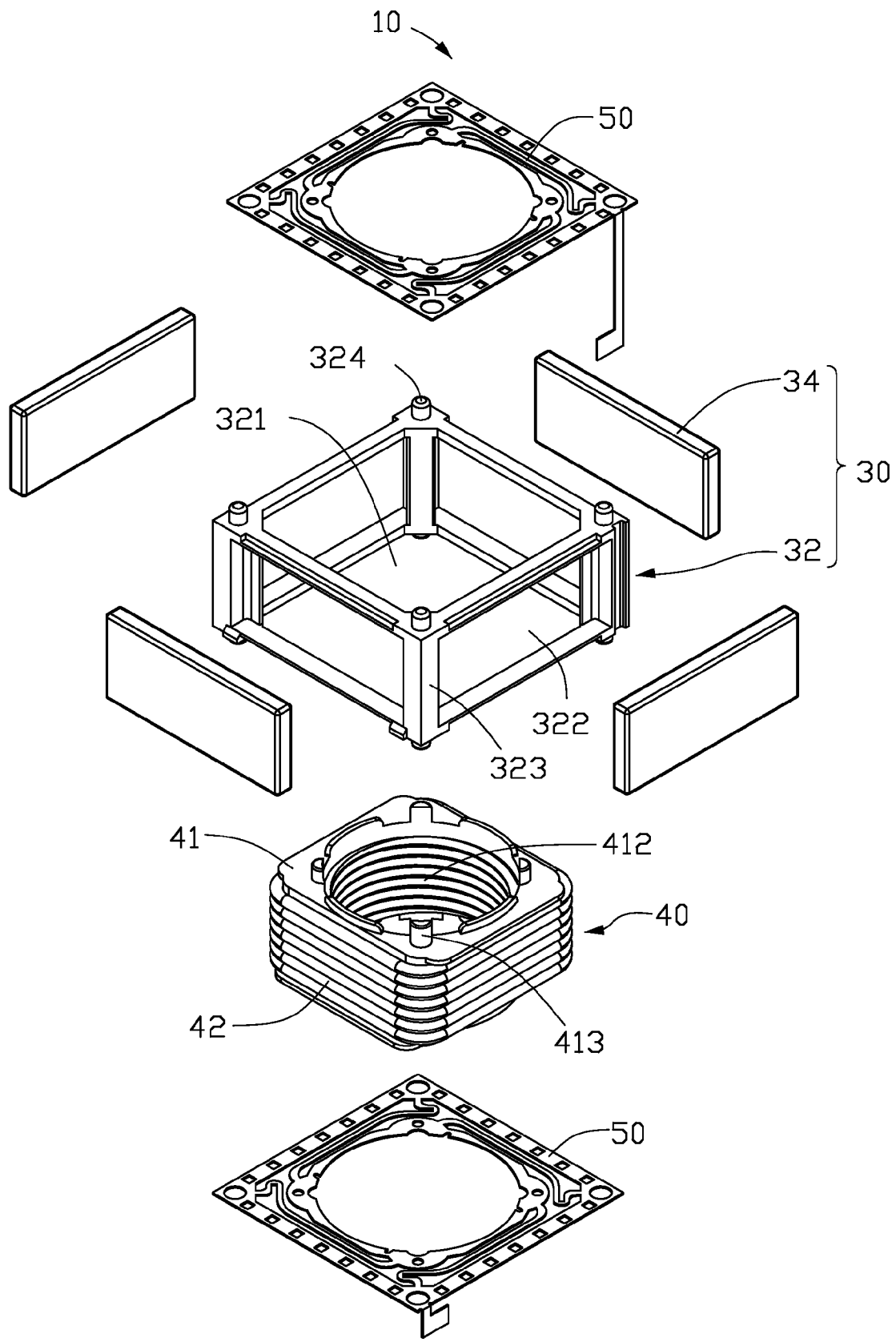
FIG. 1 is an exploded view of a lens actuator according to a first embodiment of the present invention, the lens actuator including a resilient plate.

Referring to FIG. 1, a lens actuator 10, in accordance with a first embodiment, includes a fixed unit 30, a movable unit 40, and two resilient plates 50.

The fixed unit 30 includes a cubic bracket 32 and a plurality of magnets 34. The cubic bracket 32 includes a frame body 323. A first accommodation room 321 is defined in the frame body 323. Four magnet mounting holes 322 are respectively formed in four sides of the frame body 323. The magnet mounting holes 322 are in communication with the first accommodation room 321. Four first locating pins 324 are respectively vertically protruded from the top and bottom sides of the frame body 323 at each corner thereof. The first locating pins 324 are configured for fastening the fixed unit 30 to one or both of the resilient plates 50. The number of the magnets 34 corresponds to that of the magnet mounting holes 322. The magnets 34 are respectively mounted in the magnet mounting holes 322.

The movable unit 40 includes a lens barrel 41 and coils 42 wrapped around the lens barrel 41. The movable unit 40 is accommodated in the first accommodating room 321 of the bracket 32. The lens barrel 41 defines a second accommodating room 412 for accommodating the lenses and filters (not shown). The second accommodating room 412 is a through hole. Four second locating pins 413 are protruded from the top surface of the lens barrel 41.

Figure 2:
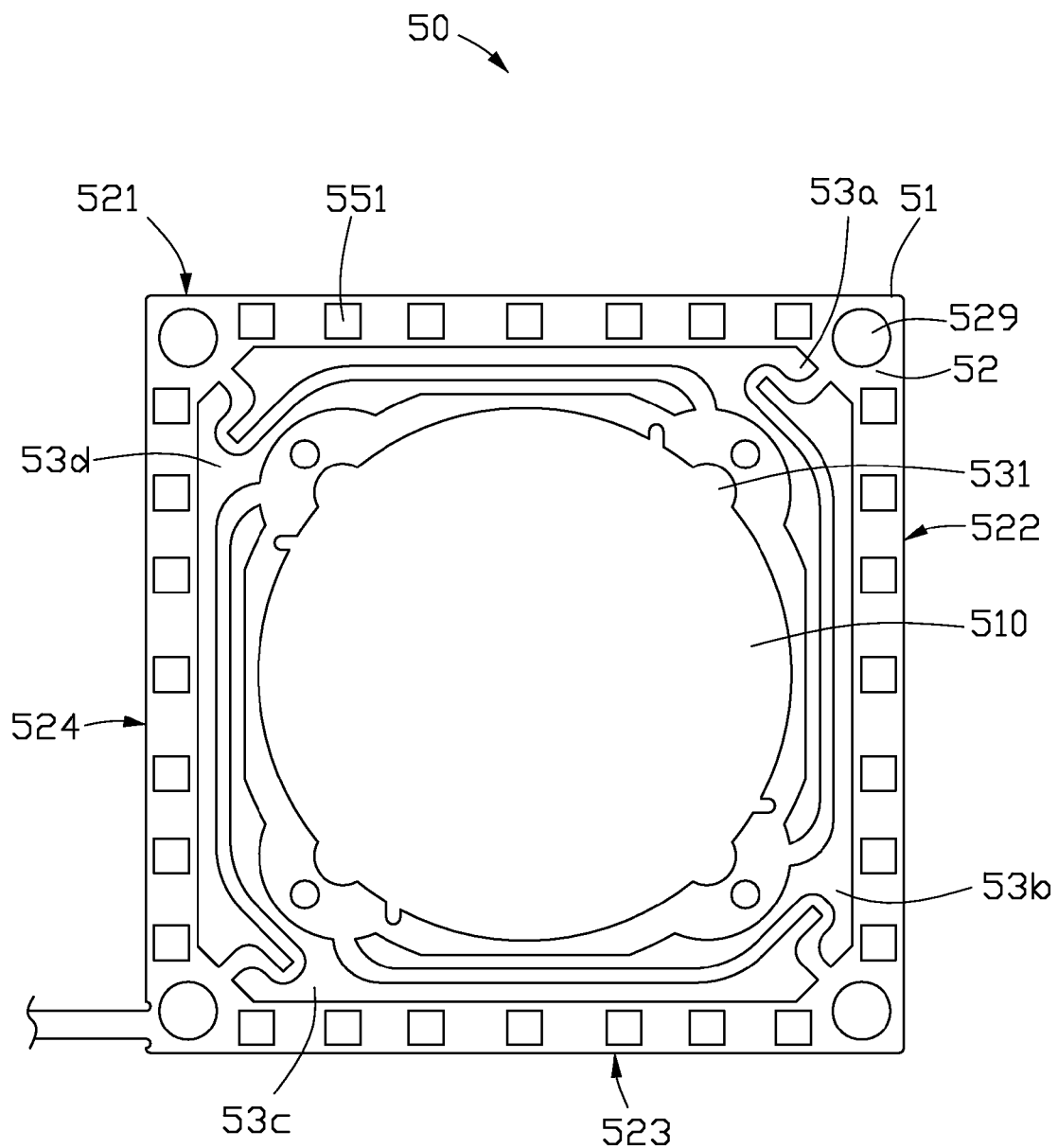
FIG. 2 is a top view of the resilient plate in FIG. 1.

Referring to FIG. 2, the resilient plate 50 comprises a body 51. The body 51 is plate shaped. In the present embodiment, the body 51 is square shaped. The body 51 includes a first edge 521, a second edge 522, a third edge 523, and a fourth edge 524. The first edge 521 is parallel to the third edge 523, and the second edge 522 is parallel to the fourth edge 524. A second through hole 510 for light passing therethrough is defined at the center of the body 51. A first slot 53a, a second slot 53b, a third slot 53c and a fourth slot 53d are defined in the body 51 surrounding the second through hole 510. Each slots (53a, 53b, 53c, 53d) is oriented at approximately right angles to adjacent slots. The slots (53a, 53b, 53c, 53d) cooperate to form a square-shaped pattern framing a central axis of the resilient plate 50.

Cutouts 531 are defined in the edge of the second through hole 510 corresponding to the respective second locating pins 413.

A periphery portion 52 is formed between the edges (521, 522, 523 and 524) and the slots (53a, 53b, 53c and 53d). Four holes 529 corresponding to the respective first locating pins 324 are defined in the periphery portion 52 in four corners.

A plurality of glue-holes 551 configured for receiving an amount of adhesive are defined in the periphery portion 52. In the first embodiment, the glue-holes 551 are square shaped and arranged in four lines substantially parallel to the first edge 521, the second edge 522, the third edge 523, and the fourth edge 524 respectively. It is understood that, in alternative embodiments, the glue-holes 551 can be circular shaped, triangle shaped, square shaped, and other geometrical shaped. The glue-holes 551 also can be arranged in circles, triangles, squares, and etc. At least one of the resilient plates 50 is fastened to at least one of the bottom sides of the bracket 32 by engagement of the holes 529 with the respective first locating pins 324 and adhesively mounting between the resilient plate 50 and the bottom surface of the bracket 32. Since the resilient plate 50 has the glue-holes 551, the durability and flexibility of the resilient plate 50 is enhanced.

When an electric current is applied to the coils 42, the coils 42 are excited to act upon the magnets 34, thereby producing a magnetic force to drive the lens barrel 42 to move between the resilient plates 50.

When electric current is cut off, the resilient plates 50 impart a pressure to the lens barrel 41 relative to the bracket 32, thereby returning the lens barrel 41 to its former position.

Figure 3:
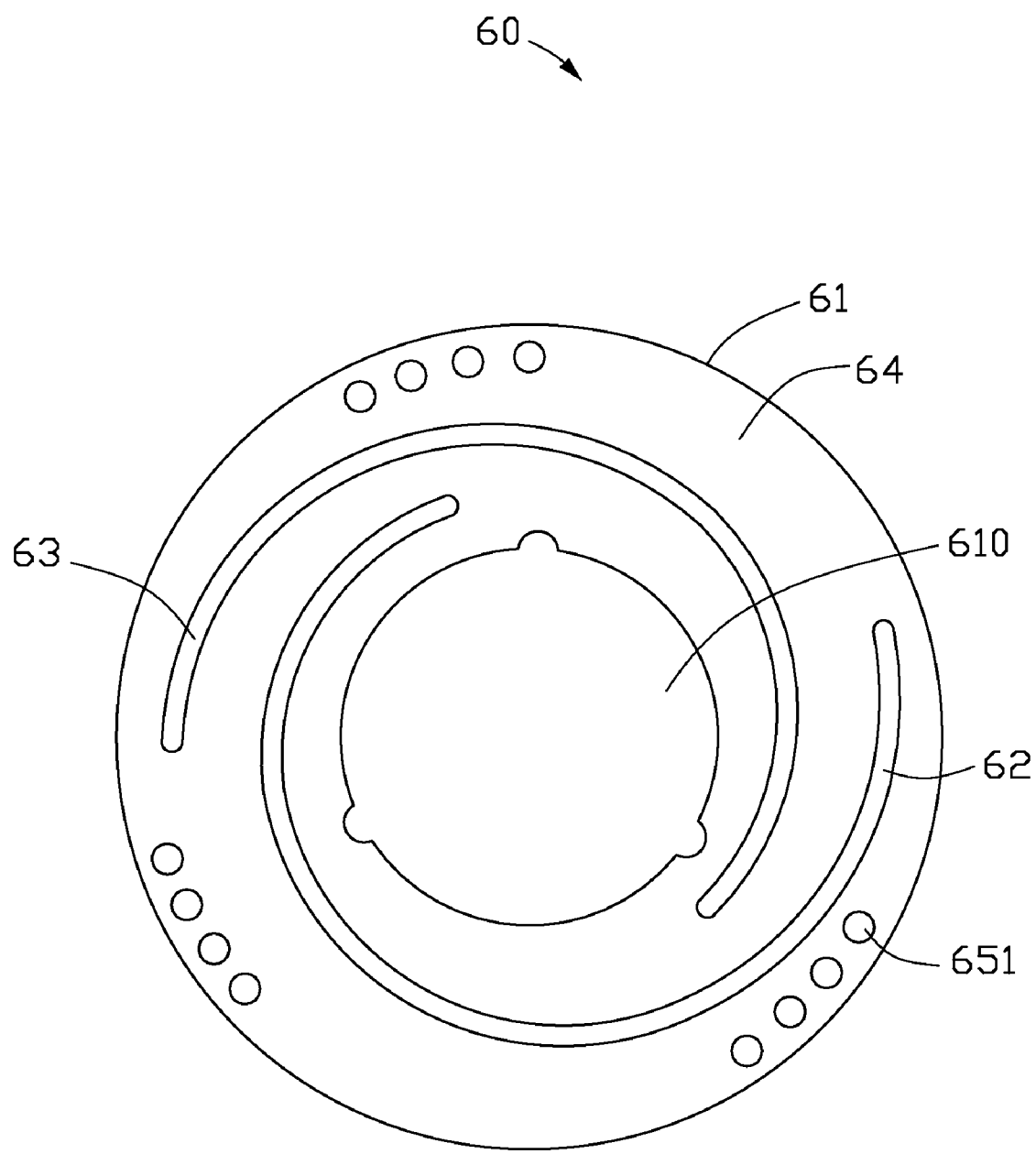
FIG. 3 is a top view of a resilient plate according to a second embodiment of the present invention.

Referring to FIG. 3, a resilient plate 60, in accordance with a second embodiment, includes a body 61. In the present embodiment, the body 61 is disk shaped. A through hole 610 for light passing therethrough is defined at the center of the body 61. A first arc-shaped slot 62 and a second arc-shaped slot 63 are defined in the body 61 surrounding the second through hole 610. The arc-shaped slots (62, 63) are oriented about 180 degrees with respect to each other. A periphery portion 64 is formed between the outer edge of the body 61 and the slots (62, 63). A plurality of glue-holes 651 configured for receiving an amount of adhesive are defined in the periphery portion 64. In the second embodiment, the glue-holes 651 are circular shaped and arranged in three arc-shaped lines parallel to the outer edge of the body 61.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens actuator resilient plate comprising:
    a plate shaped body having a central portion and a periphery portion surrounding the central portion, the plate shaped body comprising
        a through hole defined in the central portion of the plate shaped body;
        a plurality of slots defined in the plate shaped body, the slots cooperatively surrounding the through hole and being oriented an angle with respect to each other; and
        a plurality of glue-holes defined in the periphery portion of the plate shaped body, the glue-holes being configured for receiving an amount of an adhesive.

2. The lens actuator resilient plate of claim 1, wherein the plate shaped body is a substantially square plate.

3. The lens actuator resilient plate of claim 2, wherein the plate shaped body includes a first edge, a second edge, a third edge, and a fourth edge, the first edge is substantially parallel to the third edge, and the second edge is substantially parallel to the fourth edge.

4. The lens actuator resilient plate of claim 3, wherein the glue-holes are arranged adjacent to and aligned with the first edge, the second edge, the third edge, and the fourth edge.

5. The lens actuator resilient plate of claim 1, wherein the plate shaped body is a substantially disk shaped plate.

6. The lens actuator resilient plate of claim 5, wherein the glue-holes are arranged along an imaginary circle which is substantially parallel to the outer edge of the body.

7. A lens actuator, comprising:
    a lens barrel for accommodating the lens, a coil wrapped around the lens barrel, a plurality of magnets, a bracket for mounting the magnets thereon and accommodating the lens barrel therein, an adhesive, and a resilient plate connected between the bracket and the lens barrel to hold the lens barrel on the bracket, wherein the resilient plate comprises
    a plate body comprising
        a through hole defined in the center of the plate body;
        a plurality of slots defined in the plate shaped body, the slots cooperatively surrounding the through hole and being oriented an angle with respect to each other; and
        a plurality of glue-holes defined in the periphery portion of the plate body, the adhesive received in the glue-holes.

8. The lens actuator as claimed in claim 7, wherein the resilient plate further comprises a plurality of pinholes defined in the periphery portion of the plate body, the bracket comprises a plurality of first positioning pins corresponding to the pinholes, and the resilient plate is fastened to the bracket by engagement of the pinholes with the respective first positioning pins.

9. The lens actuator of claim 8, wherein the plate body is a substantially square plate.

10. The lens actuator of claim 9, wherein the plate body includes a first edge, a second edge, a third edge, and a fourth edge, the first edge is substantially parallel to the third edge, and the second edge is substantially parallel to the fourth edge.

11. The lens actuator of claim 10, wherein the glue-holes are arranged along four imaginary straight lines substantially parallel to the first edge, the second edge, the third edge, and the fourth edge respectively.

12. The lens actuator of claim 8, wherein the plate body is a substantially disk shaped plate.

13. The lens actuator of claim 12, wherein the glue-holes are arranged along an imaginary circle which is substantially parallel to the outer edge of the body.

* * * * *